United States Patent
Laarman

(10) Patent No.: US 6,520,527 B2
(45) Date of Patent: Feb. 18, 2003

(54) AIR RELEASED FIFTH WHEEL ASSEMBLY

(75) Inventor: Greg Laarman, Holland, MI (US)

(73) Assignee: Jost International Corp., Grand Haven, MI (US)

( * ) Notice: Subject to any disclaimer, the term of this patent is extended or adjusted under 35 U.S.C. 154(b) by 0 days.

(21) Appl. No.: 09/803,269

(22) Filed: Mar. 9, 2001

(65) Prior Publication Data

US 2002/0125684 A1 Sep. 12, 2002

(51) Int. Cl.⁷ .............................................. B62D 53/06
(52) U.S. Cl. ....................... 280/437; 280/433; 280/434
(58) Field of Search ................................ 280/433, 434, 280/437, 441.1

(56) References Cited

U.S. PATENT DOCUMENTS

| | | | | |
|---|---|---|---|---|
| 2,885,222 A | * | 5/1959 | Walther, Sr. ................. | 280/436 |
| 3,002,767 A | * | 10/1961 | Gresko ........................ | 280/434 |
| 3,056,612 A | * | 10/1962 | Slaven ........................ | 280/434 |
| 3,171,672 A | * | 3/1965 | Dalton ........................ | 280/437 |
| 3,318,616 A | * | 5/1967 | Fontaine et al. ............. | 280/434 |
| 3,600,006 A | * | 8/1971 | Slaven ........................ | 280/434 |
| 4,871,182 A | | 10/1989 | Altherr et al. | |
| 5,028,067 A | | 7/1991 | Madura | |
| 5,176,396 A | | 1/1993 | Hawthorne et al. | |
| 5,456,484 A | * | 10/1995 | Fontaine ..................... | 280/434 |
| 5,472,223 A | | 12/1995 | Hawthorne et al. | |
| 6,179,316 B1 | | 1/2001 | Sibley, Jr. | |
| 6,352,277 B1 | * | 3/2002 | Timmings .................... | 280/437 |
| 6,402,176 B1 | * | 6/2002 | Timmings .................... | 280/433 |

FOREIGN PATENT DOCUMENTS

WO   WO96/27519   *   9/1996   ................. 280/434

* cited by examiner

Primary Examiner—Daniel G. DePumpo
Assistant Examiner—Daniel Yeagley
(74) Attorney, Agent, or Firm—Sand & Sebolt

(57) ABSTRACT

A fifth wheel assembly for connecting a tractor trailer combination has a pressure actuated piston operated from within the cab of the tractor which releases the locking jaw from the trailer king pin. A piston rod has an internal floating rod which has a safety latch mechanism attached to its outer end to prevent premature movement of a locking lever which locks and unlocks the locking jaws. The safety latch mechanism has a pivotally mounted spring biased clevis which is moved to an unlatched position by outward movement of the piston rod when actuated to move the lever and connected locking jaw to the unlocked position. The locking jaw is retained in the unlocked position by the lever until the jaw is automatically actuated by an incoming king pin eliminating any manipulation of the locking mechanism by the vehicle operator.

22 Claims, 11 Drawing Sheets

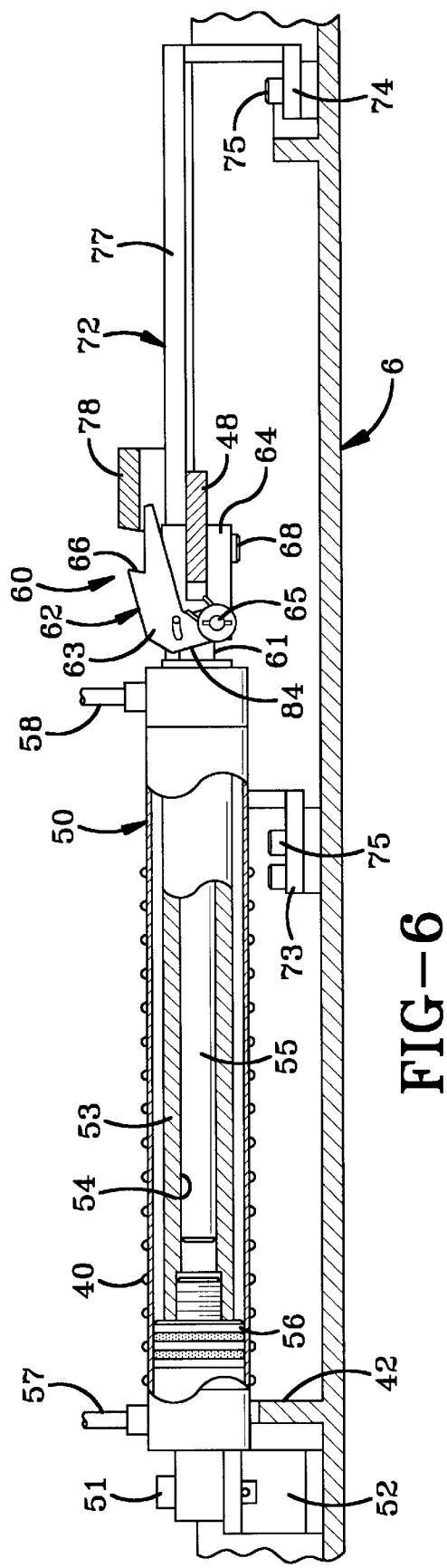
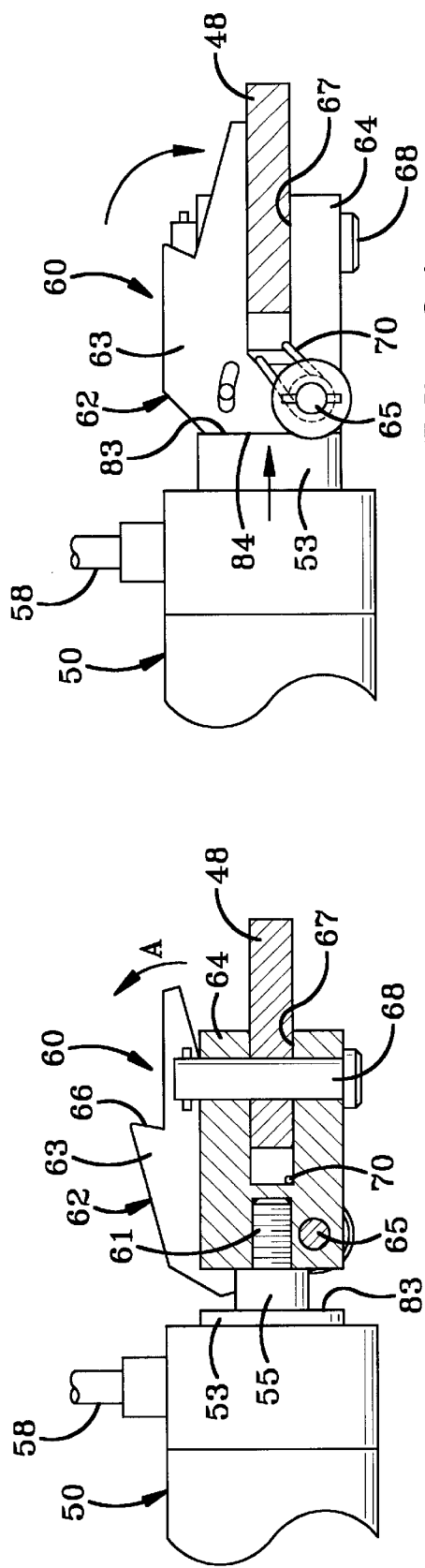

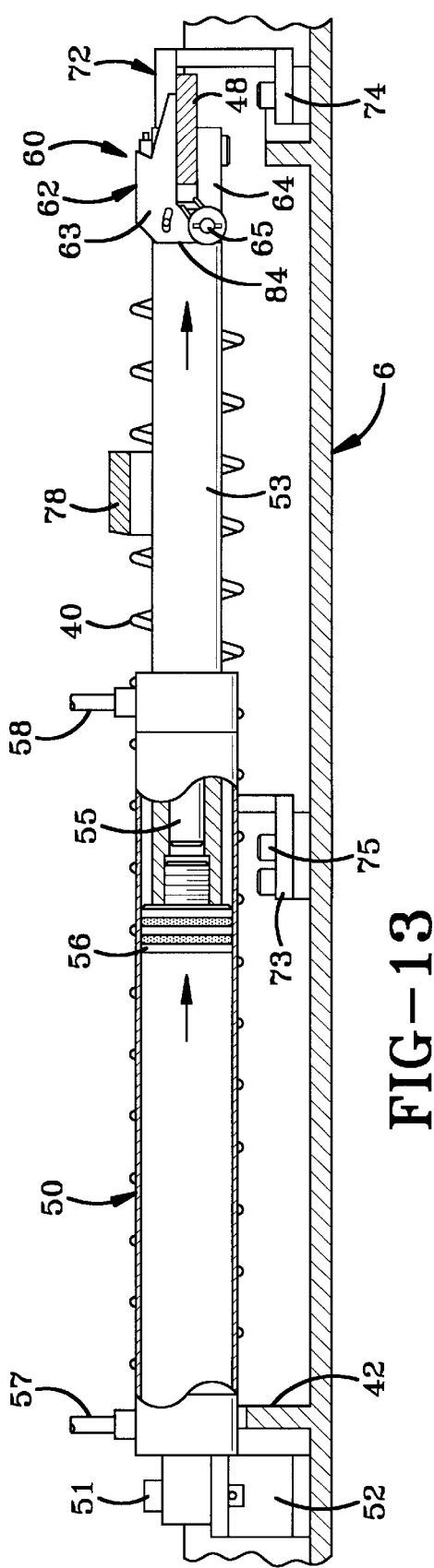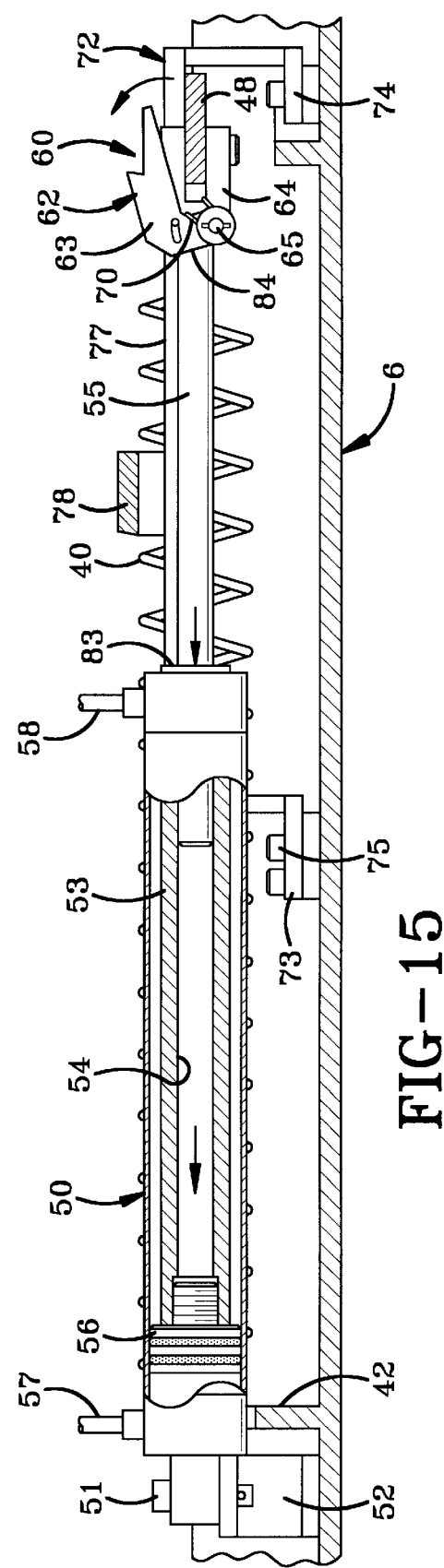

AIR RELEASED FIFTH WHEEL ASSEMBLY

BACKGROUND OF THE INVENTION

1. Technical Field

The invention relates to fifth wheel assemblies for coupling trailers to tractors and more particularly to a power actuated air release mechanism for moving the king pin locking mechanism from locked to the unlocked position. Even more particularly the invention relates to a power-actuated unlocking mechanism having a safety latch incorporated therein to assist in securing the locking mechanism in the locked position.

2. Background Information

Large highway freight trailers are usually coupled to an associated tractor by means of a fifth wheel assembly. These fifth wheel assemblies have a top plate with a generally V-shaped opening through which a king pin of the trailer moves where it is secured to the fifth wheel by some type of locking mechanism. One type of locking mechanism is a C-shaped jaw which pivots from an open position to a closed position after the king pin is received therein. Various mechanisms have been provided for moving the locking jaw between open and closed positions and for retaining the jaw in either the open or closed position. Most of these mechanisms require the operator of the vehicle to manually manipulate one or more levers on the fifth wheel assembly prior to uncoupling the tractor and trailer from each other. Some of these fifth wheel assemblies use a pressure actuated cylinder to facilitate the unlocking of the locking jaw from the king pin. Some examples of these prior art fifth wheel locking mechanisms and power actuated releases therefor are shown in U. S. Pat. No. 5,028,067, 5,176,396 and 5,472,223.

One problem that exists with many existing fifth wheel assemblies is to couple and uncouple the trailer and tractor without requiring any manual manipulation at the fifth wheel by the operator yet provide for a secure latching of the locking jaw with the king pin, and in which the locking mechanism can not prematurely move to the unlocked position due to road vibration and especially in the event of an accident where severe forces are applied in various directions to the coupling between the tractor and trailer.

SUMMARY OF THE INVENTION

The present invention provides a fifth wheel assembly which uses a pressure actuated cylinder operated by the vehicle driver from within the tractor for moving the locking mechanism from the locked to the unlocked position without requiring any manual manipulation of the locking mechanism by the operator at the fifth wheel assembly location.

Another aspect of the invention preferably provides a safety latch which assists in securing the locking mechanism in its locked position and prevents movement of the locking mechanism toward the unlocked position.

Still another feature of the invention is the ability to provide the power actuated unlocking mechanism and safety latch mechanism as a retrofitted item or kit for mounting on an existing fifth wheel assembly avoiding the necessity of replacing the entire fifth wheel to secure the advantages of the present invention.

A feature of the invention is positioning of the power actuated unlocking mechanism and associated safety latch mechanism beneath the top surface of the top plate where it is out of contact with the trailer thereby avoiding damage and which is provided with adjustment bolts to adjust the locking mechanism and safety mechanism in the desired position to compensate for manufacturing and assembly tolerances.

Still another aspect of the invention is the reduced reliance on springs which are subject to change in force to retain the locking mechanism in the locked and unlocked positions and to secure the safety latch mechanism in engagement with the unlocking mechanisms in the locked and unlocked positions.

BRIEF DESCRIPTION OF THE DRAWINGS

The preferred embodiment of the invention, illustrative of the best mode in which applicant contemplates applying the principles, is set forth in the following description and is shown in the drawings and is particularly and distinctly pointed out and set forth in the appended claims.

FIG. 6 is an enlarged fragmentary sectional view taken on line 6—6, FIG. 5;

FIG. 7 is an enlarged fragmentary sectional view of the safety latch mounted on the end of the unlocking piston;

FIG. 9A is a further enlarged fragmentary sectional view showing the safety latch being moved to a disengaged position;

FIG. 13 is an enlarged fragmentary sectional view taken on line 13—13, FIG. 12;

FIG. 15 is an enlarged fragmentary sectional view taken on line 15—15, FIG. 14;

Similar numerals refer to similar parts throughout the drawings.

DESCRIPTION OF THE PREFERRED EMBODIMENT

Figure 1:
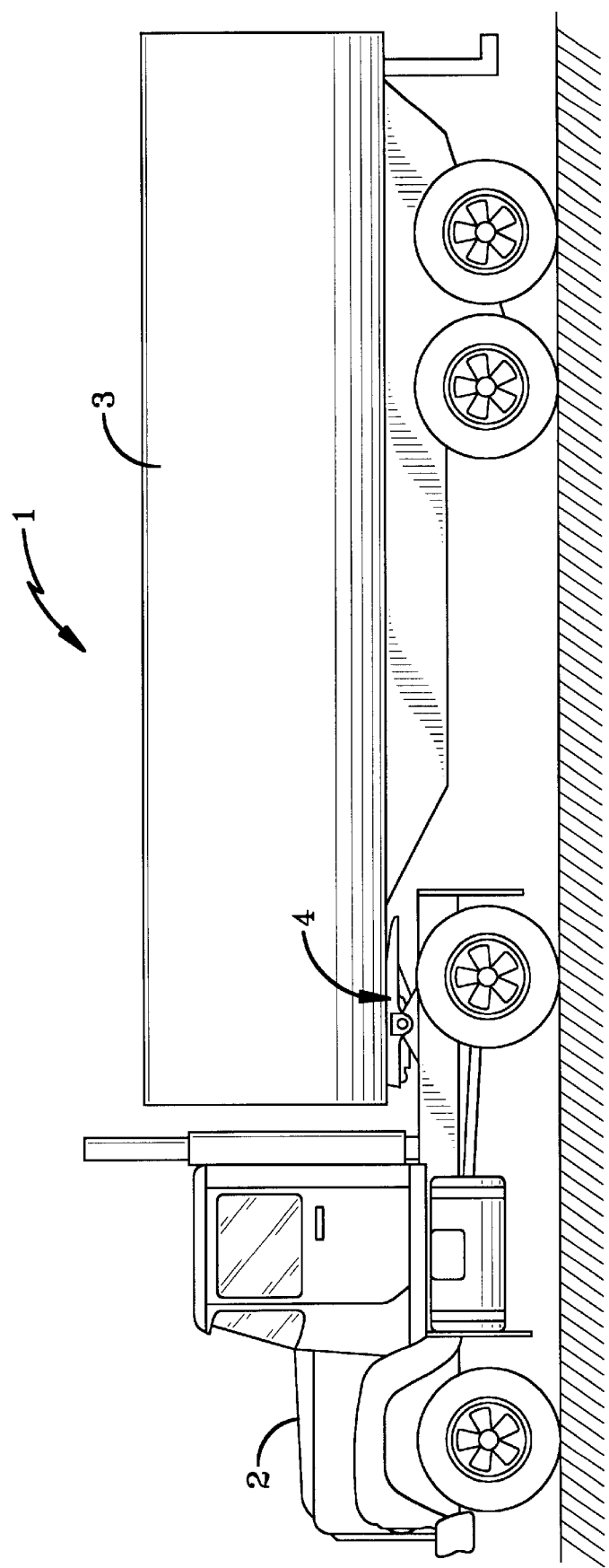
FIG. 1 is a side elevational view of a usual tractor trailer combination joined by a fifth wheel assembly.
Figure 2:
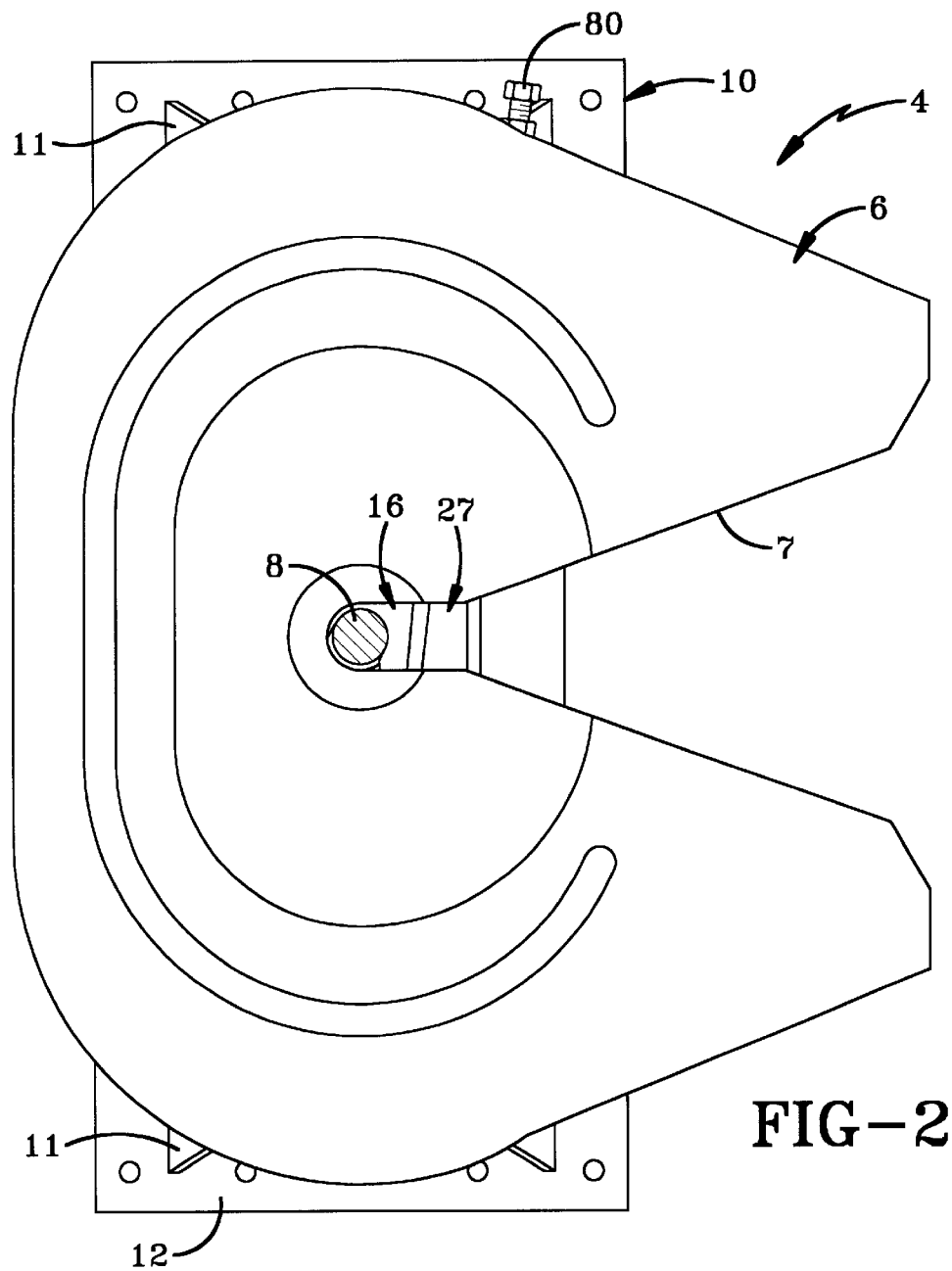
FIG. 2 is a top plan view of the fifth wheel assembly removed from the tractor trailer combination of FIG. 1.
Figure 3:
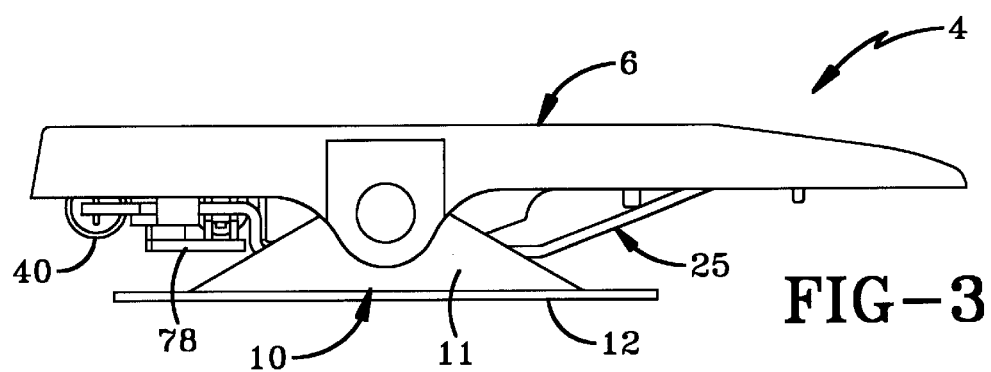
FIG. 3 is a side elevational view of the fifth wheel assembly of FIG. 2.
Figure 4:
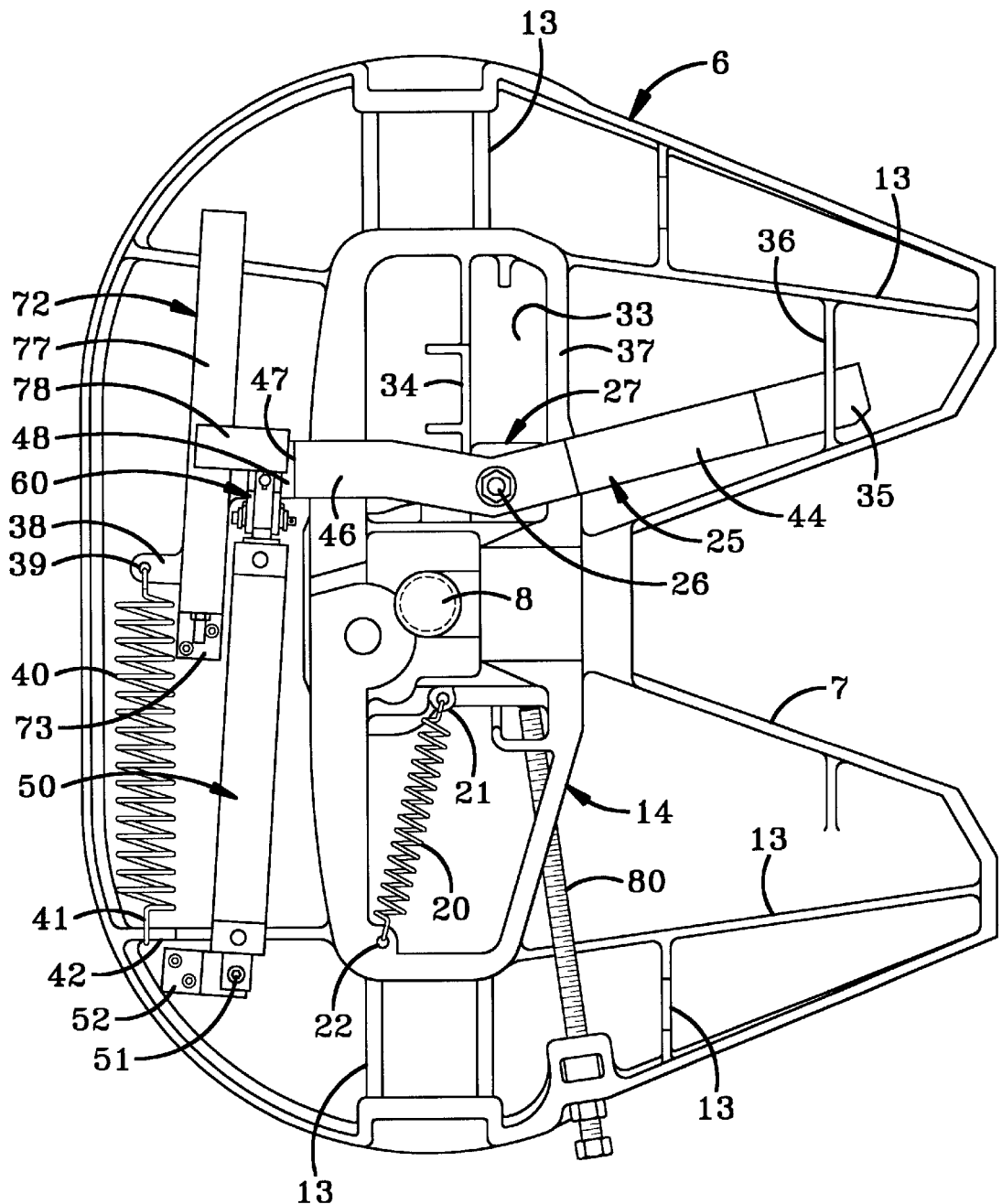
FIG. 4 is a bottom plan view of the fifth wheel assembly removed from its supporting carriage shown in locked position with the king pin of the trailer.

A usual tractor trailer combination is indicated generally at 1, and is shown in FIG. 1 and includes a tractor 2 and trailer 3 connected together by a fifth wheel assembly 4. Shown particularly in FIGS. 2 and 3, fifth wheel assembly 4 includes a usual support or top plate 6 having a V-shaped opening 7 for slidably receiving a trailer king pin 8 therein. Top plate 6 is movably mounted on a mounting bracket assembly 10 which is attached to the tractor frame (not shown). As shown in FIG. 3, top plate 6 is pivotally mounted on pedestals 11 which are secured to a base 12. However, this mounting arrangement can vary without affecting the concept of the invention.

Many of the components of the fifth wheel assembly shown in the drawings and described below in which the improved safety latch mechanism and air actuated opening mechanism is incorporated, are common in many types of fifth wheel assemblies and are shown particularly in FIGS. 4, 5, 8, 10, 12, and 14. Top plate 6 on its underside surface, will have a number of reinforcing ribs 13 extending in various directions and will include a generally oval shaped frame 14 (FIG. 4) on which many of the locking components are mounted or contained. A portion of frame 14 is broken away in many of the views to show the locking mechanism in further detail.

Figure 14:
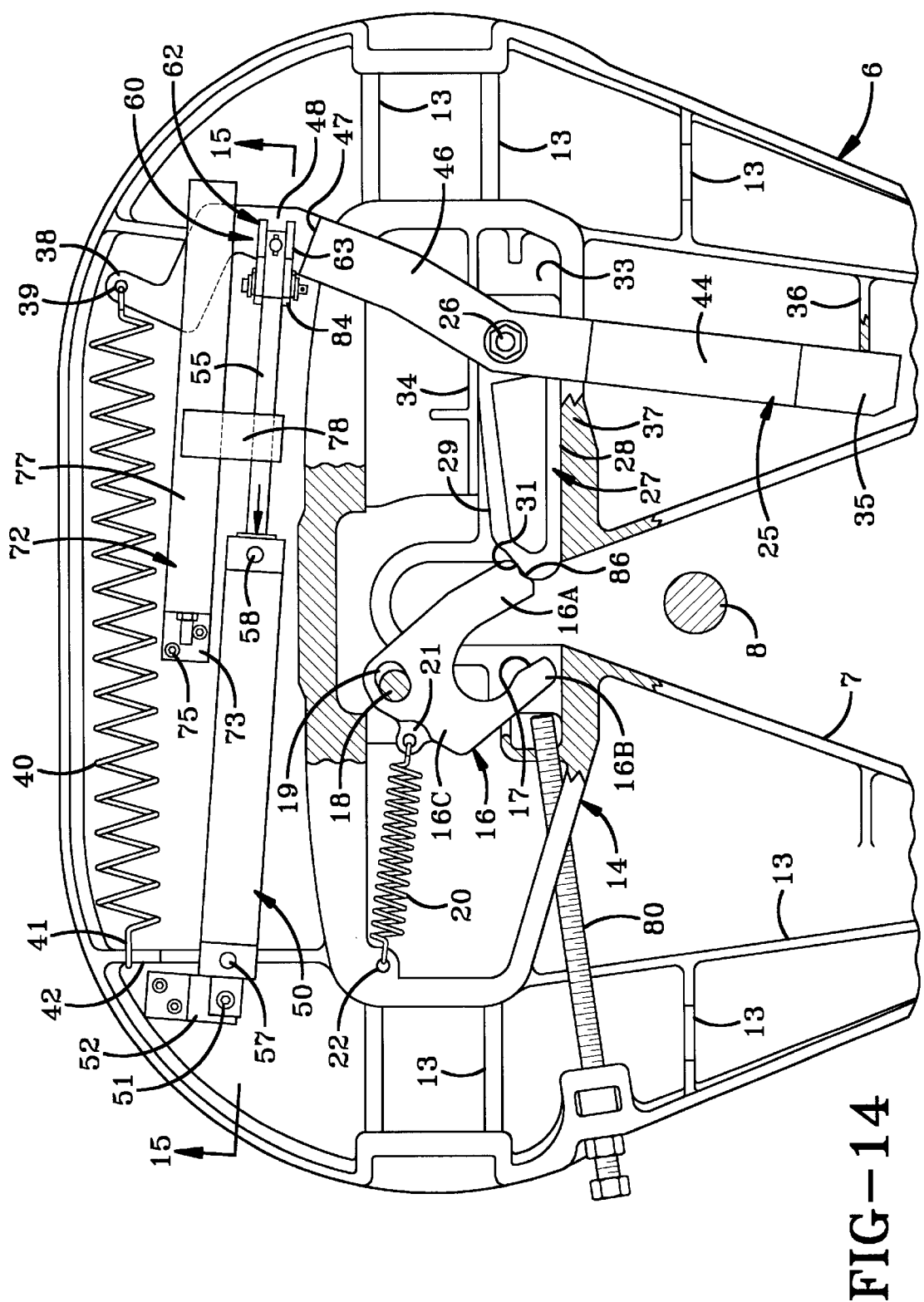
FIG. 14 is a view similar to FIG. 12 showing the components in the unlocked position with the power operated piston being retracted within the power cylinder.

The locking mechanism (FIG. 5) for securing king pin 8 on fifth wheel assembly 4 includes as its main components a loosely pivotally mounted C-shaped locking jaw 16 having a king pin receiving opening 17. Locking jaw 16 is loosely pivotally mounted on a pin 18 extending downwardly from the bottom of top plate 6 which extends into an enlarged oval-shaped opening 19 formed in jaw 16. Jaw 16 includes a pair of spaced legs 16A and 16B connected by a rear member 16C. A spring 20 extends between a tab 21 extending outwardly from member 16C of jaw 16 and is connected to frame 14 by extending through a hole 22 or other attachment means. Spring 20 biases jaw 16 from the locked position of FIG. 5 to an open unlocked king pin receiving position as shown in FIG. 14.

The locking assembly further includes a locking lever indicated generally at 25, which is pivotally connected by a bolt 26 to a locking bar indicated generally at 27. Locking bar 27 has an elongated configuration with a flat edge 28 and a tapered opposite camming edge 29 which terminates in a rounded nose 30 which is connected to edge 29 by a slightly concavely curved recessed edge 31. Locking bar 27 is slidably mounted within a generally rectangular shaped channel 33 formed by a wall 37 of frame 14 and a spaced parallel rib 34.

Lever 25 has a number of flat sections located at different levels including a free end 35 which is connected to an intermediate lever surface 46 by an inclined surface 44. Pivot bolt 26 extends through flat surface 46 for connecting lever 25 to bar 27. The other free end 48 of lever 25 has a generally Z-shaped configuration and is connected to intermediate surface 46 by a right angle stepped surface 47. Free end 35 of lever 25 extends between a rib 36 and the bottom surface of top plate 6 to permit any excessive flexing or movement of the lever away from the bottom of the top plate. Lever end 48 is formed with an outwardly projecting tab 38 having a hole 39 formed therein in which one end of a tension spring 40 is secured. The other end 41 of spring 40 is connected to a top plate rib 42. Spring 40 may have other configurations such as a pair of springs concentrically mounted with respect to each other, without effecting the invention.

In accordance with one of the main features of the invention, a pressure actuated cylinder 50 is mounted at one end by a pin 51 to a mounting bracket 52 which is mounted on the underside surface of top plate 6 (FIGS. 6, 9, 11, 13, and 15). Cylinder 50 includes an internal rod 53 which is slidably mounted therein and actuated by fluid pressure, such as pressurized air which is readily available in most large tractor type vehicles which have onboard compressors. Rod 53 has a partially hollow interior 54 in which a floating rod 55 is loosely slidably mounted. Piston rod 53 has a number of pistons 56 mounted thereon and is slidably movable within the hollow interior of cylinder 50 by spaced air inlet/outlet ports 57 and 58 which either supply or exhaust air to and from cylinder 50 depending upon the desired motion that wishes to be imparted on piston rod 53. The air cylinder 50 may also be equipped with an internal compression spring to bias the cylinder in the closed position.

In accordance with another feature of the invention, a safety latch mechanism indicated generally at 60, is mounted on outer end 61 of floating rod 55. Referring particularly to FIGS. 6, 7 and 9A, safety latch mechanism 60 includes a clevis 62 which includes a pair of spaced parallel fingers 63 which are pivotally mounted on an intervening block 64 by a pin 65. Block 64 is secured to threaded end 61 of floating rod 55 as shown in FIG. 7. The other end of block 64 is formed with a slot 67 for securing a portion of lever end 48 therein by a pin 68. A torsion spring 70 (FIG. 9A) biases clevis finger 63 in a counter clockwise direction as shown by arrow A, FIG. 7, toward a latched position. Spring 70 preferably is wrapped about pivot pin 65.

A safety latch bar 72 (FIGS. 6, 8 and 9) is mounted to the underside surface of top plate 6 and includes a pair of outwardly extending feet 73 and 74 which are secured by bolts 75 to the underside surface of top plate 6. A L-shaped latch tab 78 is secured to bar 72 and extends outwardly therefrom to provide the safety latch engagement with latch mechanism 60.

Fifth wheel assembly 4 further includes a pair of adjustable stop bolts 80 and 81 (FIG. 5) for limiting the movement of locking bar 27 and swinging end 48 of lever 25.

Figure 5:
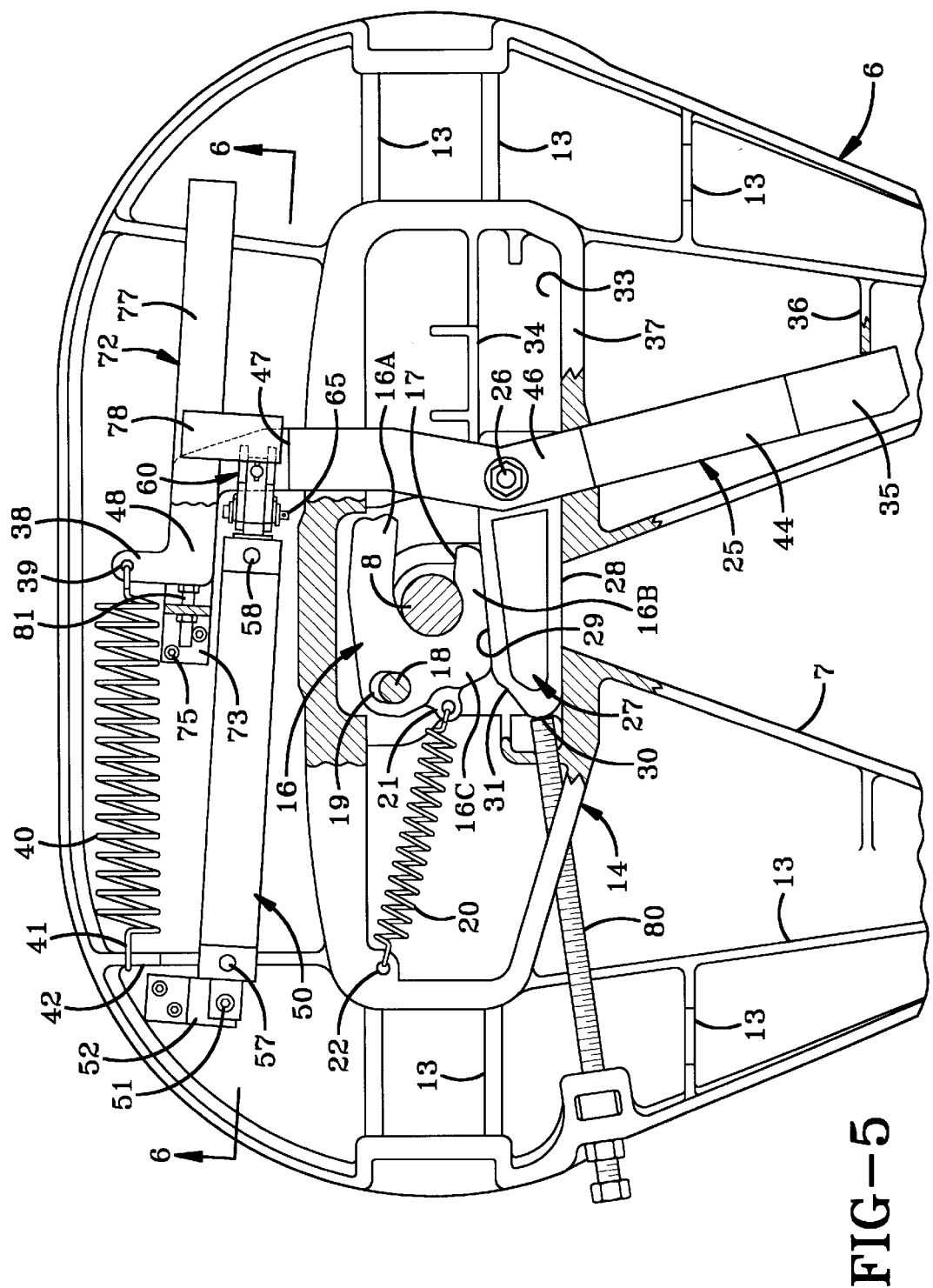
FIG. 5 is a view similar to FIG. 4 with parts broken away and in section.

The manner of operation of improved fifth wheel assembly 4, and in particular the pressure actuated unlocking mechanism and safety latch mechanism is described below and shown in FIGS. 5–15. When king pin 8 is in the locked position as shown in FIG. 5, an enlarged head thereof will be entrapped within the receiving opening 17 of C-shaped locking jaw 16. Jaw 16 is secured in the locked position by locking bar 27 which is cammingly engaged with locking jaw 16 preventing it from moving in a clockwise unlocking direction as viewed in FIG. 5 by spring 20. Locking bar 27 is retained in position by locking lever 25 which is moved into this locking position by spring 40. Stop bolt 80 engages rounded nose 30 of locking bar 27 to prevent further movement thereof in the left hand direction in FIG. 5.

Locking lever 25 is prevented from moving in a clockwise unlocking direction by safety latch mechanism 60 as shown particularly in FIG. 6. Clevis fingers 63 are biased in a counter clockwise direction by spring 70 whereby movement of locking lever 25 in a clockwise unlocking direction is prevented by engagement of latch tab 78 with notches 66 formed in clevis fingers 63. Thus as shown in FIGS. 5 and 6, locking jaw 16 is firmly retained in a locked position by locking bar 27 and lever 25 which are secured in this locked position by safety latch mechanism 60 which prevents movement of lever 25 in the unlocking direction by latch tab 78 securely mounted to the underside surface of the top plate.

Figure 8:
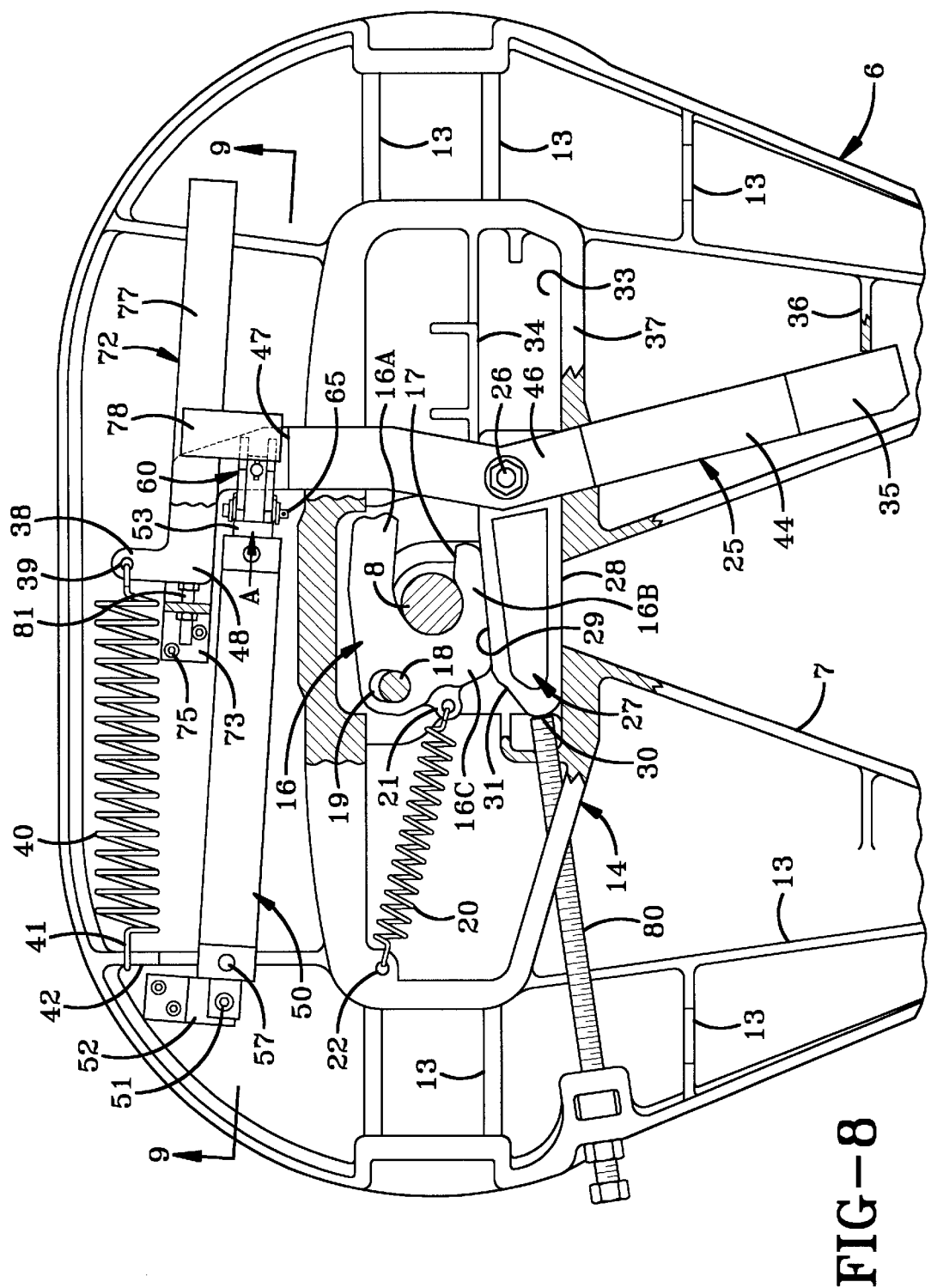
FIG. 8 is a fragmentary bottom plan view with portions broken away and in section similar to FIG. 5, showing the start of the air actuated unlocking feature.
Figure 9:
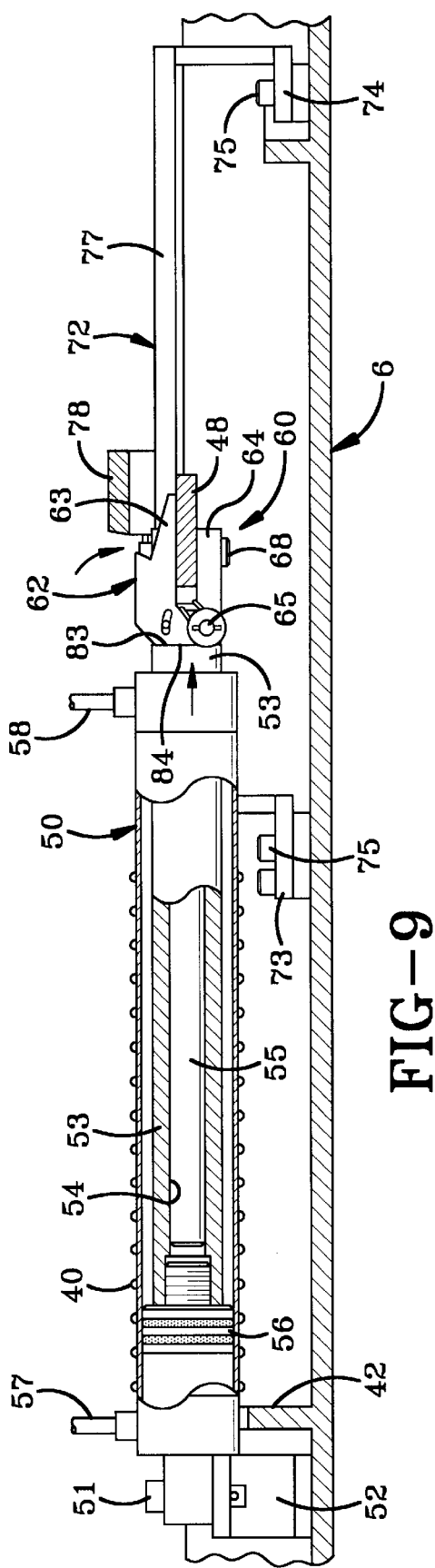
FIG. 9 is an enlarged fragmentary sectional view taken on line 9—9 FIG. 8.
Figure 11:
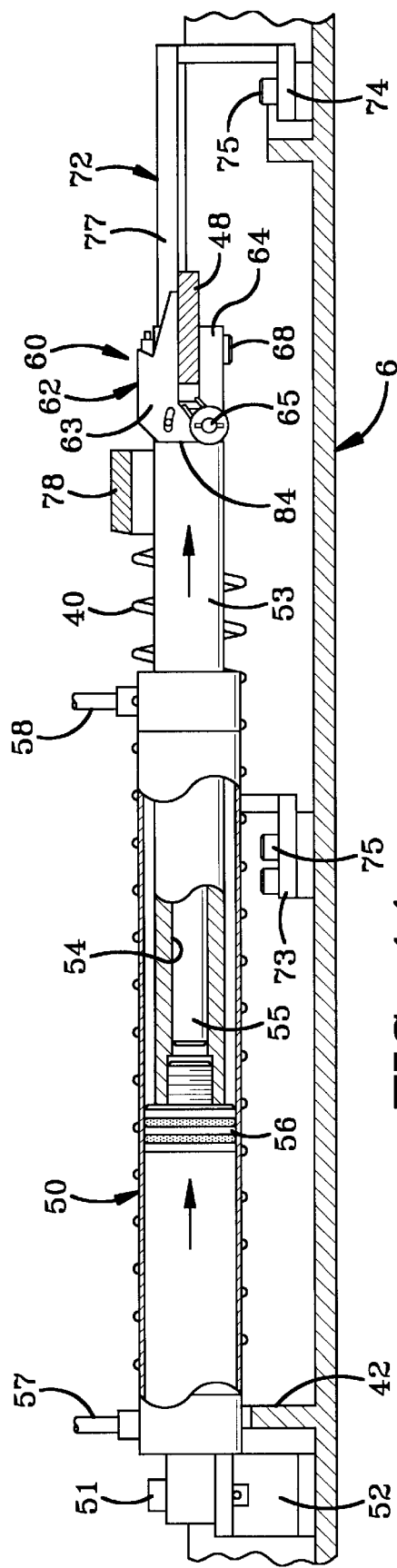
FIG. 11 is an enlarged fragmentary sectional view taken on line 11—11, FIG. 10.
Figure 10:
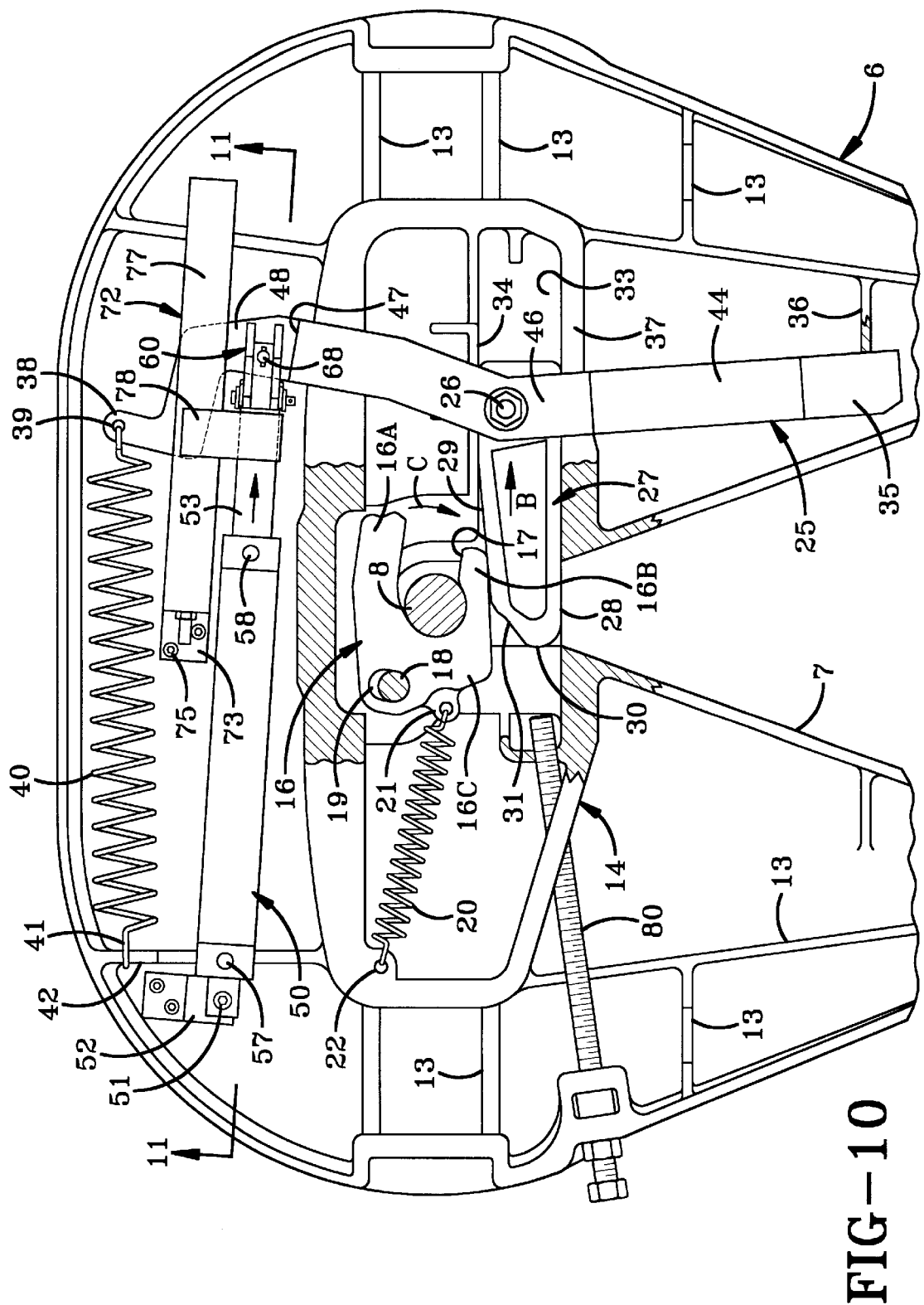
FIG. 10 is a view similar to FIG. 8 showing the locking lever and locking bar being moved toward an unlatched position by the power operated piston rod.

FIG. 8 shows the fifth wheel assembly in the locked position at the start of the unlocking procedure. Pressurized air is supplied to the interior of cylinder 50 through inlet port 57 which moves piston rod 56 and captured floating rod 55 in the direction of arrow A. As shown in FIGS. 9 and 10, the outer annular end 83 of piston rod 53 pushes against the rear surface 84 of latch mechanism 60 as shown in FIGS. 6 and 11, which will pivot finger 63 against the biasing force of spring 70 in a counter clockwise direction from its safety latched position of FIG. 6 to an unlatched position of FIG. 9. This enables the clevis fingers to move linearly between latch tab 78 and bar 77 to permit piston rod 53 and floating rod 55 to continue to move outwardly from cylinder 50 from the position of FIG. 9 to that of FIG. 11 bringing with it latch mechanism 60 which is attached to floating rod 55. Likewise, this linear outward movement of piston rod 53 and floating rod 55 moves connected lever end 48 in a clockwise direction (FIG. 10) causing locking bar 27 to slide within channel 33 (arrow B, FIG. 10) from the locked position of FIGS. 5 and 8 to the unlocked position of FIG. 12. Upon lever 25 and bar 27 reaching their unlocked positions as shown in FIG. 12, spring 20 will pivot locking jaw 16 in a clockwise direction (arrow C, FIGS. 10 and 12) from the position of FIG. 5 to the position of FIG. 12 since locking bar 27 has slid out of contact with the bottom surface of locking jaw leg 16B.

Figure 12:
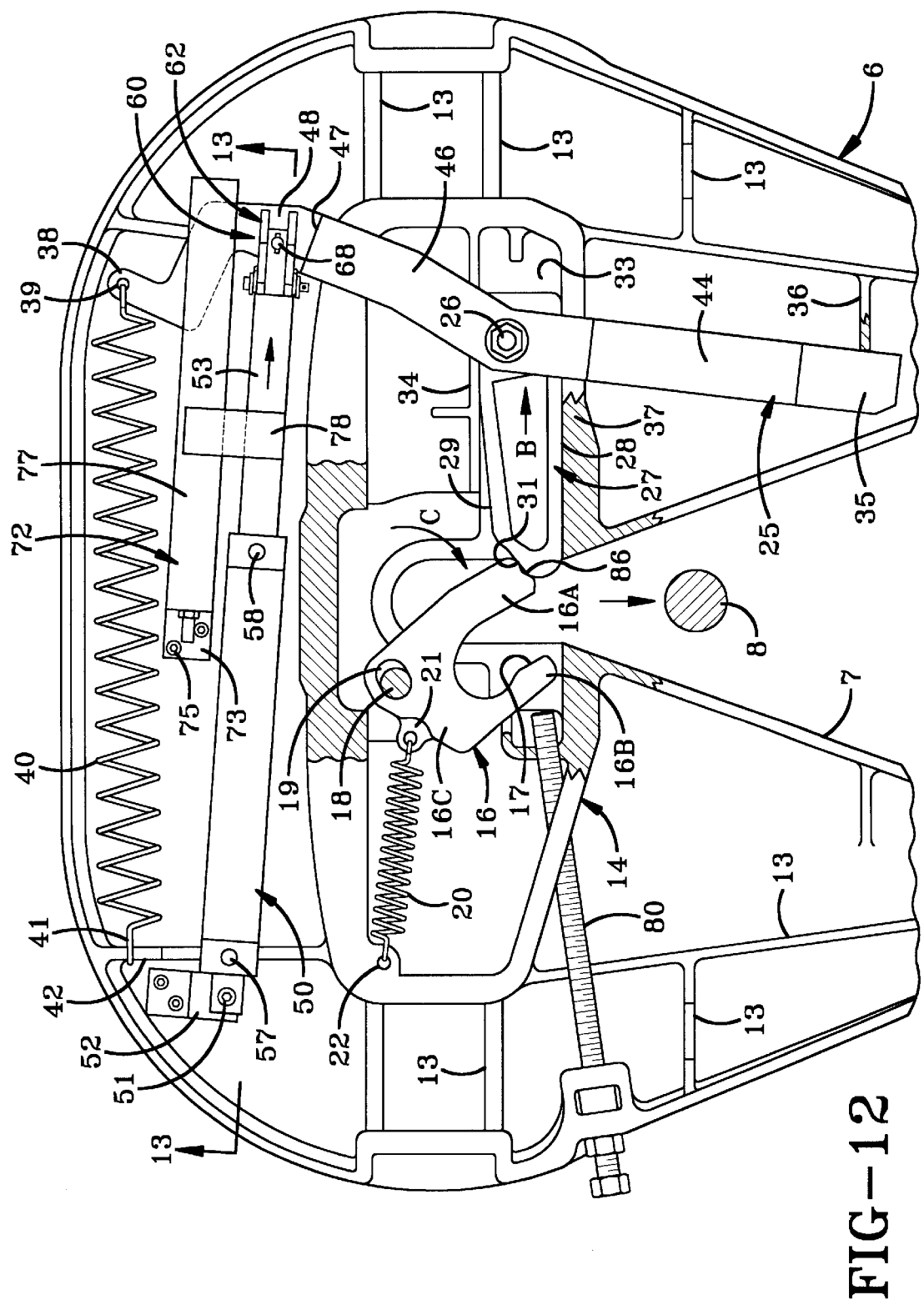
FIG. 12 is a view similar to FIG. 10 showing the locking jaw and locking lever in the unlocked position with the locking jaw being retained by the locking bar and the king pin being removed from the fifth wheel assembly.

In accordance with another feature of the invention, locking jaw 16 is retained in its unlocked position as shown in FIG. 12, by engagement of an outer end 86 of locking jaw leg 16A with concave edge 31 of locking bar 27. This secures locking jaw 16 in the unlocked position enabling king pin 8 to slide outwardly from receiving opening 17 and V-shaped slot 7 of fifth wheel assembly 4 as the tractor and trailer are moved apart. Locking jaw 16 is retained in this unlocked position where jaw opening 17 is in position for receiving king pin 8 when being moved therein as shown by arrow D, FIG. 14.

As can be seen in FIG. 14, upon movement of king pin 8 in the direction of arrow D it will engage portion 16A of jaw 16 overcoming the bias of spring 20 and move jaw 16 in a counter clockwise position from the unlocked position of FIGS. 12 and 14 to the locked position of FIG. 5. This will enable spring 40 to move lever 25 in a counter clockwise direction moving locking bar 27 along channel 33 until it moves under finger 16B and secures jaw 20 in locked position as shown in FIG. 5. Lever 25 will move floating rod 55 and latching mechanism 60 to the position shown in FIG. 5. Previously to the re-engagement of king pin 8 with locking jaw 16 the air pressure supplied to cylinder 50 through port 57 would have been shut off at the time of uncoupling the trailer from the tractor. Also the pressurized air will have been supplied to the opposite end of cylinder 50 through air port 58 retracting piston rod 53 from its extended position of FIGS. 11, 13 and 15 to its retracted position of FIGS. 6 and 9. However, floating rod 55 and latch mechanism will remain in its extended position as shown in FIGS. 14 and 15, since rod 55 is unaffected by the return of piston rod 53 back to its retracted position within cylinder 50 since rod 55 is loosely slidably mounted therein. This enables locking lever 25 to remain in the unlocked position of FIG. 14 enabling locking bar 27 to engage locking jaw 16 to maintain the locking jaw in its open position ready to receive king pin 8 therein when the fifth wheel is used again to couple a trailer to tractor 2.

Accordingly the improved fifth wheel assembly of the present invention provides a power actuated mechanism for unlocking the fifth wheel from the king pin by the operator usually from within the cab of the vehicle, and which requires no further manipulation on behalf of an operator to reset the locking mechanism of the fifth wheel assembly for reattaching a king pin of a trailer thereto since the locking jaw and securing mechanism is already in position when in the unlocked position for receiving the king pin and for automatically moving to a locked secured position without any manual manipulation thereof by the operator.

Furthermore, the safety latch mechanism assists in securing the locking mechanism in its locked position until the power actuated mechanism is actuated reducing the possibility of an unwanted unlocking of the king pin due to road vibration and in the event of a accident since pressure must be applied to the cylinder in order to unlatch safety latch mechanism 60 permitting lever 25 and bar 27 to be moved to an unlocked position thereby enabling the locking jaw to subsequently move to the unlocked position permitting the king pin to slide through the opening of the locking jaws.

These features can be obtained in a usual fifth wheel assembly by being supplied in kit form and attached thereto avoiding replacing the entire fifth wheel assembly since it requires only the attachment of a power actuated piston and associated specially designed locking bar and safety latch tab. Again, these features are able to be obtained by the unique piston containing the power actuated piston rod having the floatable rod contained therein which is connected to the end of lever 25 and which has the safety latch mechanism 60 mounted thereon to avoid the unwanted movement of the locking lever and corresponding locking bar 27 towards the unlocked position prior to actuation of the air release mechanism.

Accordingly, the improved air released fifth wheel assembly is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the air released fifth wheel assembly is constructed and used, the characteristics of the construction, and the advantageous new and useful results obtained; the new and useful structures, devices, elements, arrangements, parts, and combinations are set forth in the appended claims.

What is claimed:

1. A fifth wheel assembly for locking and unlocking a king pin of a trailer to a tractor comprising:
    a support plate having an open V slot for receiving and releasing the king pin from the fifth wheel assembly;
    a locking jaw mounted on the support plate and movable between locked and unlocked positions with the king pin;
    a locking bar slidably engaged with the locking jaw and movable towards and away from said locking jaw to retain said locking jaw in the locked position with the king pin;
    a locking lever mounted on the locking bar for moving said locking bar between locking and unlocking engagement with the locking jaw;
    a power actuated piston rod operatively connected to the locking lever for moving said locking lever and locking bar toward the unlocked position, said piston rod containing a floating rod movably mounted within a hollow interior of said piston rod; and a safety latch mounted on the floating rod and connected to the locking lever to restrict movement of the locking lever, locking bar and locking jaw toward the unlocked position with the king pin until the piston rod is actuated by a power source.

2. The fifth wheel assembly defined in claim 1 wherein the safety latch includes a pivotally mounted clevis spring biased toward a latched position.

3. The fifth wheel assembly defined in claim 2 wherein the piston rod is operatively engaged with the clevis to move the clevis toward an unlatched position against the spring bias when the piston rod is actuated.

4. The fifth wheel assembly defined in claim 2 wherein the clevis is formed with a slot; and in which the locking lever is received in and secured by a pivot pin in said slot.

5. The fifth wheel assembly as defined in claim 1 including a stop member engageable with the locking lever to limit movement of the locking lever in locking direction.

6. The fifth wheel assembly defined in claim 1 including a spring attached to the locking jaw and biasing said jaw toward the unlocked position.

7. The fifth wheel assembly defined in claim 1 including a spring attached to the locking lever biasing the lever and connected locking bar toward locking engagement with the locking jaw.

8. The fifth wheel assembly defined in claim 1 including a latch tab mounted on the support plate and engageable by the safety latch to restrict movement of the locking lever.

9. The fifth wheel assembly defined in claim 1 wherein the locking jaw is generally C-shaped having a pair of spaced legs forming a pin receiving opening therebetween; and in which the bar is engaged with one of said legs of the locking jaw when in the locked position to maintain said jaw in the locked position until the piston rod is actuated.

10. A fifth wheel assembly for locking and unlocking a king pin of a trailer to a tractor comprising:

a support plate having an open V slot for receiving and releasing the king pin from the fifth wheel assembly;

a locking jaw mounted on the underside of the support plate and movable between locked and unlocked position adjacent the V slot with the king pin;

a first spring biasing the locking jaw toward the unlocked position with the king pin;

a locking bar slidably engageable with the locking jaw and movable towards said locking jaw to retain said locking jaw in the locked position with the king pin and movable away from said locking jaw when said locking jaw moves into the unlocked position;

a locking lever pivotally mounted on the locking bar for moving said locking bar between locking and unlocking engagement with the locking jaw;

a second spring biasing the locking lever and locking bar toward the locked position with the locking jaw;

a cylinder containing a power actuated piston rod operatively connected to a swinging end of the locking lever for moving said locking lever and locking bar toward the unlocked position, said piston rod containing a floating rod movably mounted within a hollow interior of said piston rod;

a safety latch mounted on the end of the floating rod and connected to the locking lever to restrict movement of the locking lever and locking jaw toward the unlocked position until the piston rod is actuated by a power source; said safety latch including:

a pivotally mounted clevis spring biased toward a latched position which prevents premature movement of the locking lever, said clevis being mounted on an extend end of the floating rod and engageable by the piston rod for pivotal movement to an unlatched position.

11. The fifth wheel assembly defined in claim 10 including a stop member engageable with the locking lever to limit movement of the locking bar in locking direction.

12. The fifth wheel assembly defined in claim 10 wherein the locking jaw is generally C-shaped having a pair of spaced legs forming a pin receiving opening therebetween; and in which the bar is engaged with one of said legs of the locking jaw when in the locked position to maintain said jaw in the locked position until the piston rod is actuated.

13. The fifth wheel assembly defined in claim 10 wherein a latch bar is mounted on the underside of the support plate and includes an outwardly projecting tab; and in which the clevis is spring biased toward latching engagement with said tab.

14. The fifth wheel assembly defined in claim 10 wherein the locking lever is formed with an intermediate portion containing a pin to pivotally mount said lever to the locking bar; a first free end connected to the intermediate position by an inclined position; and in which the swinging end of the lever is generally Z-shaped.

15. A kit for retrofitting onto a fifth wheel assembly to provide for a pressurized release of a locking mechanism from a king pin of a tractor wherein said fifth wheel assembly has a top plate containing a locking jaw engageable with the trailer king pin, and a locking lever for moving the locking jaw between locked and unlocked position; said kit comprising:

a pressure actuated piston rod and movably mounted within a cylinder, said piston rod containing a floating rod within a hollow interior of said piston rod; and a safety latch connected to the floating rod movable to an unlatched position by the piston rod, said safety latch being adapted to be connected to the locking lever to retain said lever in the locked position until moved by the piston rod.

16. The kit defined in claim 15 including a latching tab adapted to be mounted on the top plate adjacent the safety latch; and in which the safety latch includes a spring biased clevis adapted to operatively connect the floating rod to the locking lever and engageable with the latching tab to retain the locking lever in the locked position.

17. The kit defined in claim 16 wherein the clevis is formed with a slot and pivot pin for attaching the locking lever to the safety latch.

18. The kit defined in claim 15 including a spring adapted to be connected between the locking lever and top plate to bias the lever toward the locked position.

19. The fifth wheel assembly defined in claim 5, wherein the stop member comprises at least one bolt mounted on the support plate, the bolt being engageable with the locking lever to limit movement of the locking lever in a locking direction.

20. The fifth wheel assembly defined in claim 5, wherein the stop member comprises at least one bolt mounted on the support plate, the bolt being engageable with the locking bar to limit movement of the locking lever in a locking direction.

21. The fifth wheel assembly defined in claim 11, wherein the stop member comprises at least one bolt mounted on the support plate, the bolt being engageable with the locking lever to limit movement of the locking lever in a locking direction.

22. The fifth wheel assembly defined in claim 11, wherein the stop member comprises at least one bolt mounted on the support plate, the bolt being engageable with the locking bar to limit movement of the locking lever in a locking direction.

* * * * *